(12) United States Patent
Bonaria (10) Patent No.: US 12,504,467 B2
(45) Date of Patent: Dec. 23, 2025

(54) WAFER PROBER (71) Applicant: SPEA S.P.A., Volpiano (IT)

(72) Inventor: Luciano Bonaria, Volpiano (IT)

(73) Assignee: SPEA S.P.A., Volpiano (IT)

( * ) Notice: Subject to any disclaimer, the term of this patent is extended or adjusted under 35 U.S.C. 154(b) by 150 days.

(21) Appl. No.: 18/292,980

(22) PCT Filed: Jul. 28, 2022

(86) PCT No.: PCT/IB2022/056979
§ 371 (c)(1),
(2) Date: Jan. 29, 2024

(87) PCT Pub. No.: WO2023/007415
PCT Pub. Date: Feb. 2, 2023

(65) Prior Publication Data
US 2025/0076371 A1   Mar. 6, 2025

(30) Foreign Application Priority Data
Jul. 29, 2021  (IT) .................. 102021000020321

(51) Int. Cl.
*G01R 31/28* (2006.01)
*G01R 1/02* (2006.01)
(Continued)

(52) U.S. Cl.
CPC ..... *G01R 31/2887* (2013.01); *G01R 31/2893* (2013.01)

(58) Field of Classification Search
CPC ........ G01R 31/00; G01R 31/02; G01R 31/28; G01R 1/02; G01R 1/04; G01R 1/067; G01R 1/073
See application file for complete search history.

(56) References Cited

U.S. PATENT DOCUMENTS

| 7,368,930 B2 | 5/2008 | Hobbs et al. |
| 2012/0299610 A1 | 11/2012 | Bieck |

(Continued)

FOREIGN PATENT DOCUMENTS

CN      113092992 A      7/2021

OTHER PUBLICATIONS

PCT International Search Reporting dated Oct. 28, 2022 for PCT Application No. PCT/IB2022/056979.

*Primary Examiner* — Neel D Shah
(74) *Attorney, Agent, or Firm* — McCarter & English, LLP (57) ABSTRACT

A wafer prober includes a support structure defining a first upper guide and a first lower guide parallel to a first horizontal axis and vertically overlapping with each other, measuring units that each include a first carriage sliding along a first guide, a second guide carried by the first carriage and parallel to a second horizontal axis orthogonal to the first axis, a second carriage sliding along the second guide, and a movable terminal assembly carried by the second carriage, and a measuring head carried by the movable terminal assembly and provided with needle contacts that interact with points of the wafer. The movable terminal assembly is configured to move the measuring head according to a linear degree of freedom along a vertical axis and at least one rotational degree of freedom about the vertical axis. The wafer prober includes a control unit that controls the measuring units independently.

11 Claims, 6 Drawing Sheets

(51) Int. Cl.
*G01R 1/04* (2006.01)
*G01R 1/067* (2006.01)
*G01R 1/073* (2006.01)
*G01R 31/00* (2006.01)
*G01R 31/02* (2006.01)

(56) References Cited

U.S. PATENT DOCUMENTS

2014/0197860 A1* 7/2014 Hsu .................... G01R 1/07357
    324/756.07
2020/0141976 A1 5/2020 Lim et al.
2021/0088581 A1 3/2021 Lou et al.

* cited by examiner

WAFER PROBER

CROSS-REFERENCE TO RELATED APPLICATIONS

This Patent Application is a 35 U.S.C. § 371 National Stage filing of International Application No. PCT/IB2022/056979, filed Jul. 28, 2022, which claims priority from Italian Patent Application No. 102021000020321 filed on Jul. 29, 2021, the entire disclosure of which is incorporated herein by reference.

TECHNICAL FIELD

The present invention relates to an automatic machine used for testing wafers comprising a plurality of semiconductor components, hereinafter referred to as a "wafer prober".

STATE OF THE ART

As is known, on wafers, the various semiconductor components are generally arranged next to and parallel with each other with a uniform pitch, in a substantially matrix arrangement.

Testing these wafers is normally carried out with wafer probers provided with measuring units configured for the sequential testing of the components.

The manufacturers of semiconductor devices, for a better exploitation of the space in wafers, tend to adopt increasingly complex configurations wherein, for example, the components are arranged rotated one with respect to the other and/or variably spaced.

Therefore, there is a need for a wafer prober with high flexibility that allows the fast and effective measuring of wafers comprising semiconductor components arranged with variable orientations and/or spacing.

The purpose of the present invention is to provide a wafer prober that makes it possible to overcome the above-mentioned problems.

DISCLOSURE OF INVENTION

The above-mentioned purpose is achieved by a wafer prober according to claim 1.

BRIEF DESCRIPTION OF DRAWINGS

For a better understanding of the present invention, a preferred embodiment is described below, by way of non-limiting example and with reference to the attached drawings, wherein.

DETAILED DESCRIPTION OF THE INVENTION

Figure 1:
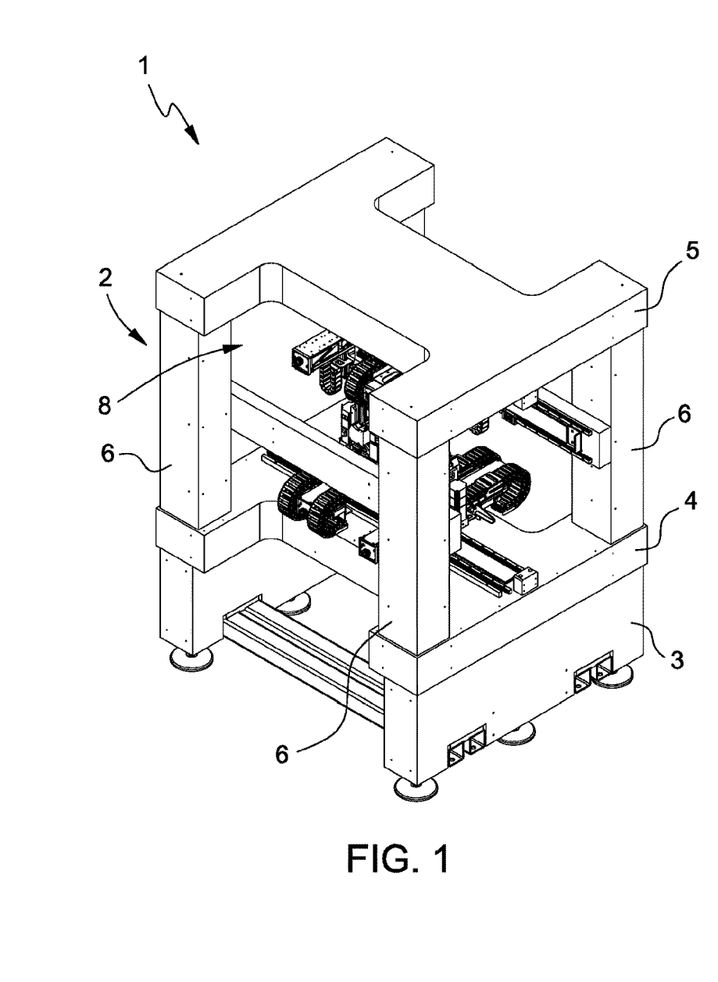
FIG. 1 is a perspective view of a wafer prober according to the present invention.
Figure 2:
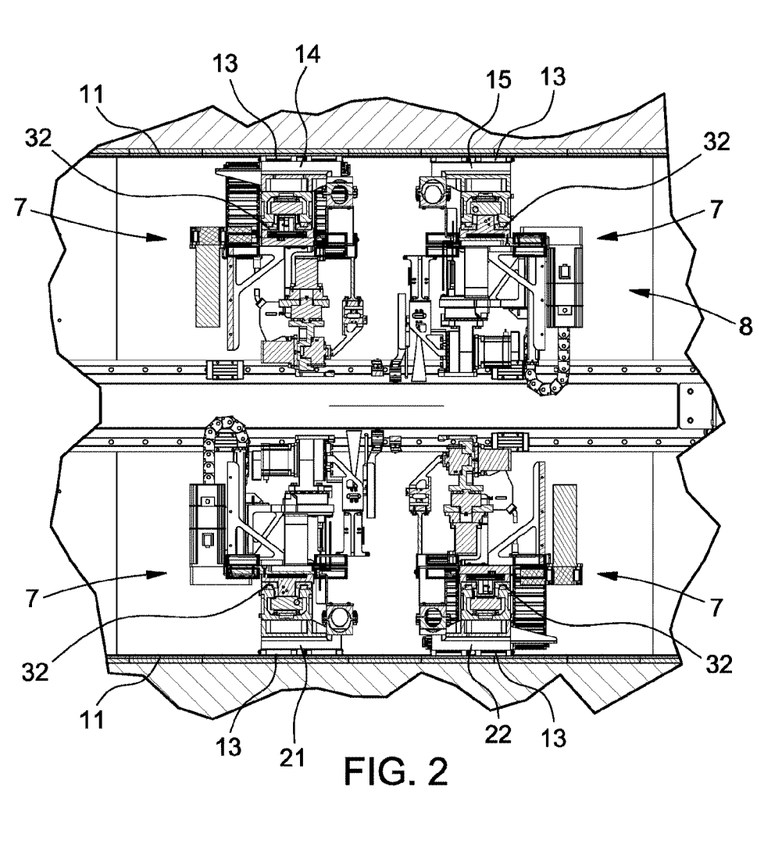
FIG. 2 is a partial cross-sectional view of the wafer prober of FIG. 1.

With reference to FIG. 1, there is indicated by 1 a wafer prober according to the present invention and configured to test a wafer comprising a plurality of semiconductor components. The wafer prober 1 comprises a support structure 2, preferably made of granite, comprising a base 3 which supports a horizontal lower plane 4 and an upper plane 5 parallel to the lower plane 4 and supported by four columns 6. The wafer prober 1 also comprises a plurality of measuring units 7 movable within a compartment 8 in the shape of a parallelepiped delimited by the lower plane 4 and the upper plane 5.

Each of the planes 4, 5 carries a respective guide 11 fixed thereto and parallel to a horizontal X axis, hereinafter referred to as "X guide". The X guides 11 vertically overlap each other.

In the example illustrated, the wafer prober 1 comprises four measuring units 7. Each measuring unit 7 comprises a carriage sliding along a respective X guide via a linear motor 12 and sliding blocks 13. In particular, the wafer prober 1 comprises two upper X carriages 14, 15 and two lower X carriages 21, 22.

Figure 5:
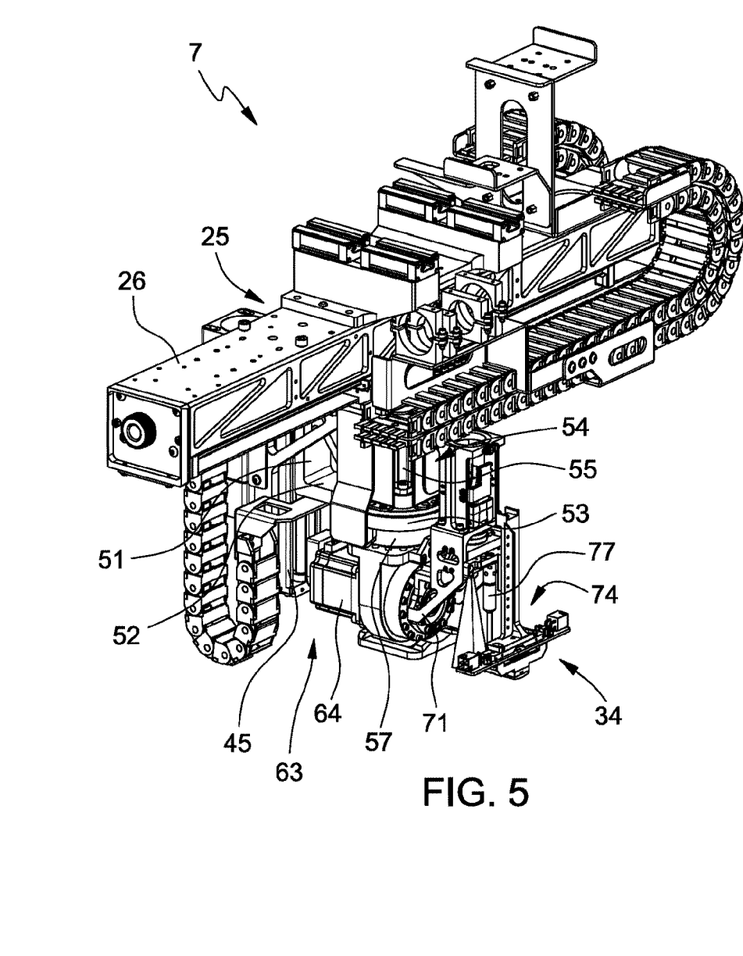
FIG. 5 is a perspective view of a measuring unit of the wafer prober of FIG. 1.

Each of the X carriages carries a movable Y assembly 25. Below, without loss of generality, the first upper movable Y assembly, carried by the X carriage 14, is considered (FIG. 5). What is described here applies similarly for the remaining upper movable Y assembly, carried by the X carriage 15, and, in a symmetrical way, for the lower movable Y assemblies, carried by the X carriages 21, 22.

The movable Y assembly 25 comprises a Y guide 26, parallel to a horizontal Y axis perpendicular to the X axis, and a Y carriage 27 that slides on the Y guide 26 via a linear motor 31 and sliding blocks 32. Therefore, the movement along the Y axis is similar to that along the X axis.

The Y carriage 27 carries a movable terminal assembly 33 configured to move a respective measuring head 34 in the compartment 8 according to three further degrees of freedom (for a total of five degrees of freedom overall): one linear degree of freedom along a vertical Z axis orthogonal to the X and Y axes, and two rotational degrees of freedom, corresponding to a rotation of an angle θ about the Z axis and a rotation of an angle φ about a horizontal axis, respectively.

The movable terminal assembly 33 (FIG. 6) comprises a primary bracket 41 comprising a horizontal arm 42 extending along the X axis and coupled to the Y carriage 27, and a vertical arm 43 extending from one end of the horizontal arm 42 along the Z axis downwards. The vertical arm 43 carries a rotary motor 44 with a vertical axis, on the opposite side of the horizontal arm 42, and a screw-nut system 45, arranged below the horizontal arm 42.

Figure 6:
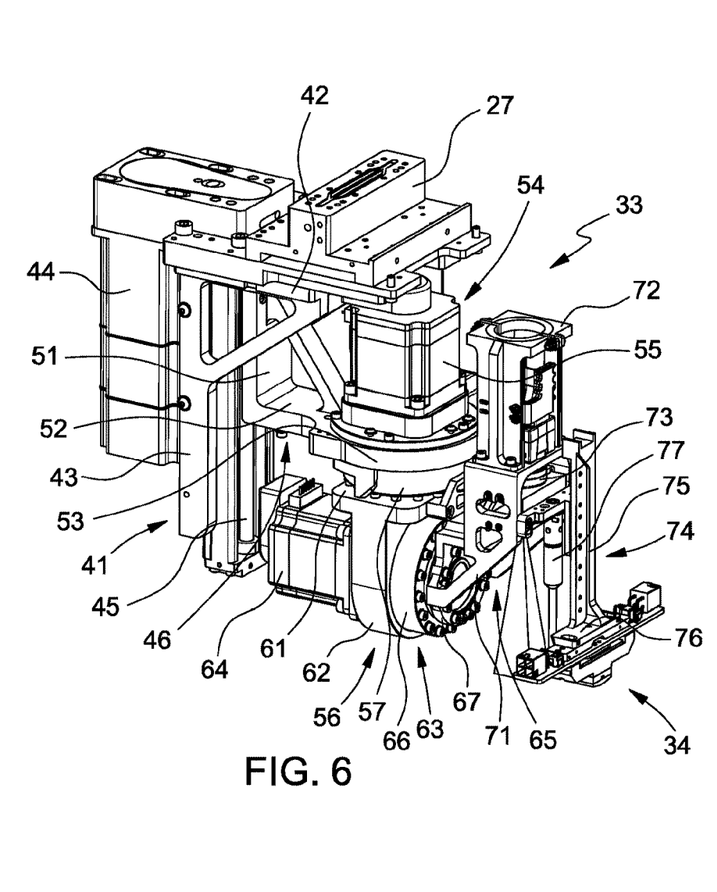
FIG. 6 is a perspective view of a detail of the unit of FIG. 5, with parts removed for the sake of clarity.

The rotary motor 44, preferably a brushless motor, is responsible for the degree of freedom along the Z axis. In particular, the rotary motor 44 drives the screw-nut system 45 via a belt transmission (not illustrated).

The screw-nut system 45 drives a secondary bracket 46 movable along the Z axis and comprising a vertical arm 51, which slides along the Z axis, and a horizontal arm 52.

The horizontal arm 52 extends from the lower end of the vertical arm 51 and has, at its opposite end, an annular support 53 with a vertical axis which supports a movable θ assembly 54.

The movable θ assembly 54 comprises a primary motor 55 with a vertical axis and a primary support element 56, placed respectively above and below the annular support 53, and a primary gear unit 57 vertically interposed therebetween.

The primary motor 55, preferably a stepper motor, is responsible for the first rotational degree of freedom, corresponding to the rotation of angle θ about the Z axis. In particular, the primary motor 55 brings into rotation the primary support element 56 via the primary gear unit 57, which is a zero-backlash gear unit which allows irreversibility of motion.

The primary support element 56 comprises a horizontal plate 61, which is coupled to the primary gear unit 57 and has, below, an annular appendage 62 with a horizontal axis which supports a movable φ assembly 63.

The movable φ assembly 63 comprises a secondary motor 64 with a horizontal axis and a secondary support element 65, placed on axially opposite sides the annular appendage 62, and a secondary gear unit 66 axially interposed therebetween.

The secondary motor 64, preferably a stepper motor, is responsible for the second rotational degree of freedom, corresponding to the rotation of angle φ about its horizontal axis. In particular, the secondary motor 64 brings into rotation the secondary support element 65 via the secondary gear unit 66, which is a zero-backlash gear unit which allows irreversibility of motion. Therefore, the movement relating to the movable φ assembly 63 is similar to that relating to the movable θ assembly 54.

The secondary support element 65 comprises an annular structure 67 with a horizontal axis coupled to the secondary unit 66, and a terminal bracket 71 extending gear cantilevered integrally and axially from the annular structure 67 which carries a support structure 72.

The support structure 72 may be of a different shape in the various measuring units 7 to allow a relatively close arrangement of the measuring heads 34 and thus their simultaneous use on the same wafer. The support structure 72 is hollow and internally houses a camera 73, with an optical axis A normally vertical, which makes it possible to visualise the device under test. The support structure 72 carries a T-shaped support 74 which comprises a shank 75 extending parallel to the optical axis A and in the opposite direction with respect to the camera 73, and an element 76 extending transversely to the shank 75, which carries the measuring head 34 described in detail hereinafter.

Preferably, the support structure 72 carries a probe 77, interposed between the optical axis A of the camera 73 and the shank 75 of the support 74 and parallel to them, configured to interact with known references so as to perform an initial calibration of the wafer prober 1.

The measuring head 34 (FIG. 7) comprises a metallic support 82 configured to be fixed to the element 76 of the support 74 of the movable terminal assembly 33, a base printed circuit 81 extending parallel to the metallic support 82 and fixed thereto, connectors 83, 84 coupled to the base printed circuit 81 on the side of the metallic support 82, and a probe card 85 coupled to the base printed circuit 81 on the opposite side with respect to the metallic support 82 and configured to contact the wafer under test.

Figure 7:
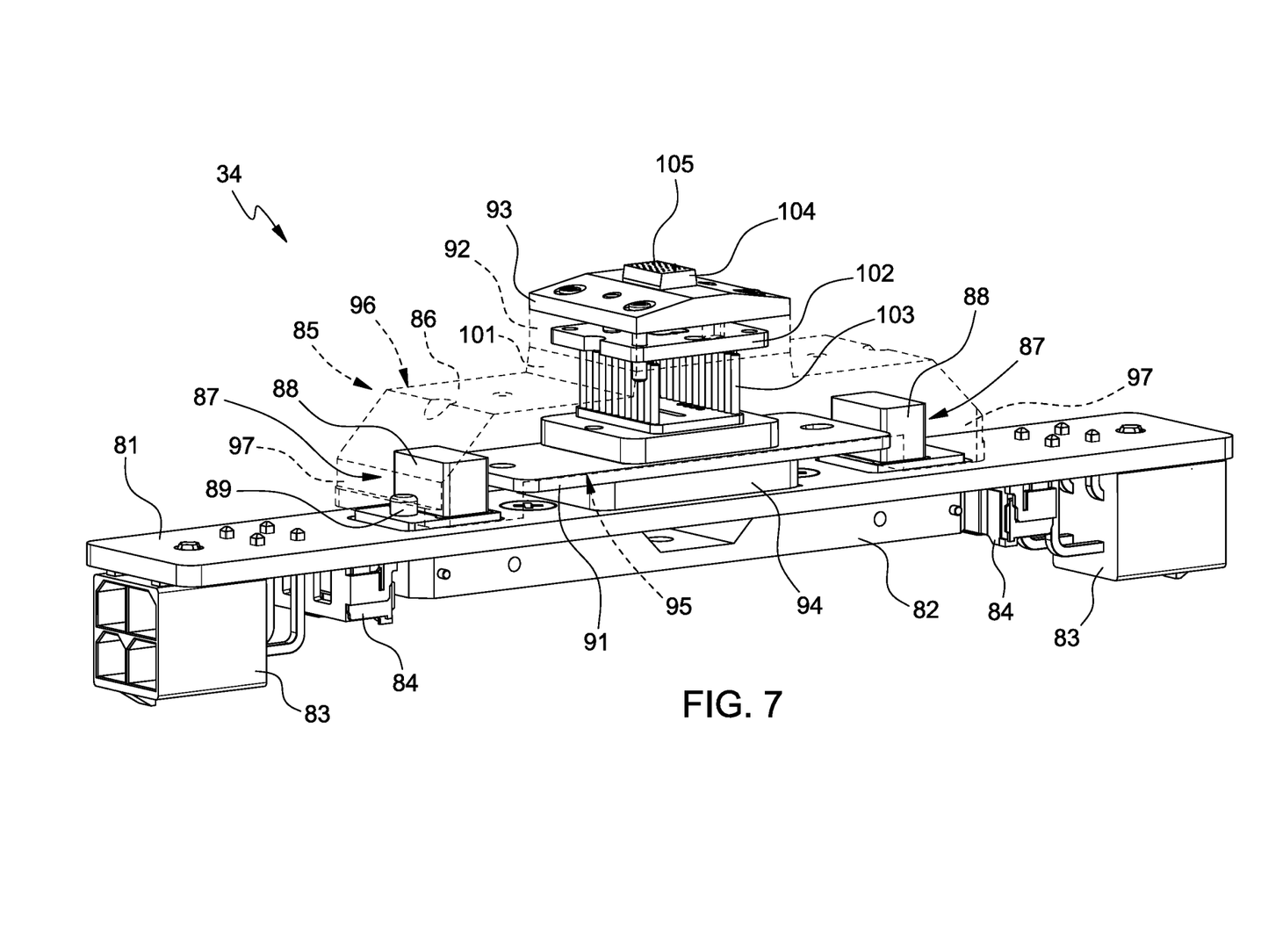
FIG. 7 is a perspective view of a measuring head of the unit of FIG. 5 with parts in transparency.

The base printed circuit 81 is an elongated board which carries, on its own ends projecting with respect to the metallic support 82, respective connectors 83 for power and respective connectors 84 for signals. The connectors 83, 84 are connected to the control electronics of the wafer prober 1 in a conventional way not described in detail.

The probe card 85 comprises a main body 86 which can be coupled to the metallic support 82 via a quick coupling 87, an intermediate printed circuit 91 fixed to the main body 86 on the side facing the metallic support 82, an intermediate plate 92, and a terminal element 93 fixed to a face of the intermediate plate 92 opposite the main body 86.

The intermediate printed circuit 91 is an elongated board arranged parallel to the base printed circuit 81 and connected thereto via a connector 94 which internally has elastic needle contacts of a known and non-illustrated type for the transmission of power and signals from the base printed circuit 81 to the intermediate printed circuit 91.

The main body 86 of the probe card 85 has an elongated shape extending parallel to the base printed circuit 81 and comprising a lower face 95 to which the intermediate printed circuit 91 is coupled, and an upper face 96. The lower face 95 of the main body 86 has, at its ends, lower projections 97 connectable to the metallic support 82 via the quick coupling 87.

The quick coupling 87 comprises a pair of magnets 88 housed in the respective lower projections 97 and corresponding magnets (not illustrated) housed in the metallic support 82. The quick coupling 87 further comprises centring pegs 89 carried by the metallic support 82 and corresponding seats made in the lower projections 97 in the proximity of the magnets 88.

The upper face 96 of the main body 86 has, centrally, an upper projection 101 to which the intermediate plate 92 is coupled.

The intermediate plate 92 internally houses a terminal printed circuit 102 to which power and signals arrive from the intermediate printed circuit 91 via a plurality of elastic needle contacts 103 housed in the main body 86 of the probe card 85.

The end element 93 has an upper block 104 from which emerges a plurality of needle contacts 105 connected with the end printed circuit 102 and configured to interact with predetermined points of the wafer.

Since the measuring head 34 has a modular structure with interchangeable components, it is possible to use different probe cards 85 on the same measuring head 34, and different end elements 93 on the same probe card 85.

As specified above, the movable Y assembly 25 and each component described successively is replicated four times. In particular, the wafer prober 1 comprises two upper measuring heads (including the measuring head 34) and two lower measuring heads (symmetrical with respect to the upper measuring heads), each of which has five degrees of freedom: three linear degrees of freedom, defined by the axes X, Y and Z, and two rotational degrees of freedom, defined by the angles θ and φ. The motion associated with each degree of freedom is due to the respective motor 12, 31, 44, 55, 64 and has an impact on all the components downstream of it.

Figure 8:
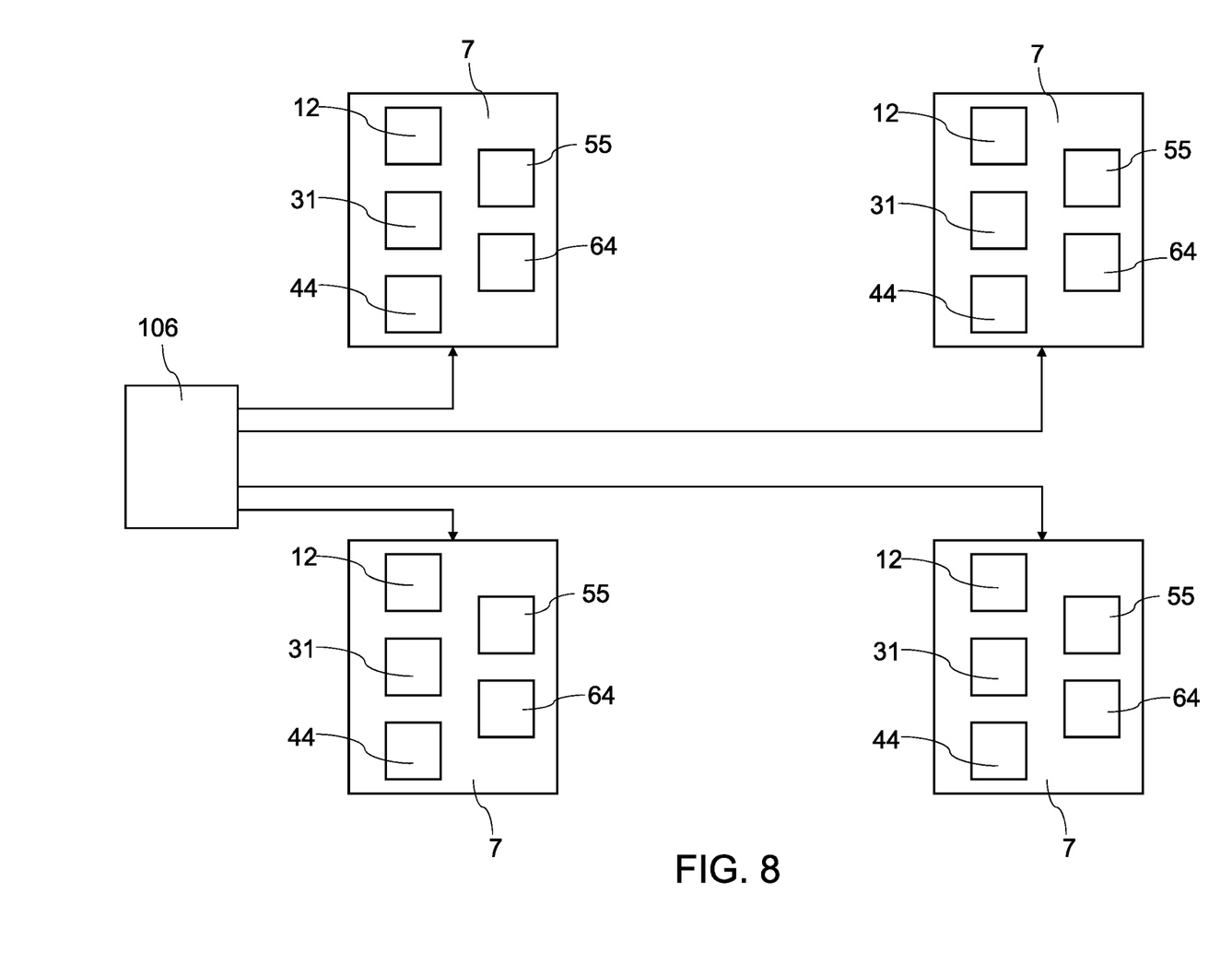
FIG. 8 is a block diagram of the wafer prober of FIG. 1.

As represented schematically in FIG. 8, the wafer prober 1 comprises a control unit 106 which controls, independently of each other, the five motors 12, 31, 44, 55, 64 of each measuring unit 7.

Figure 3:
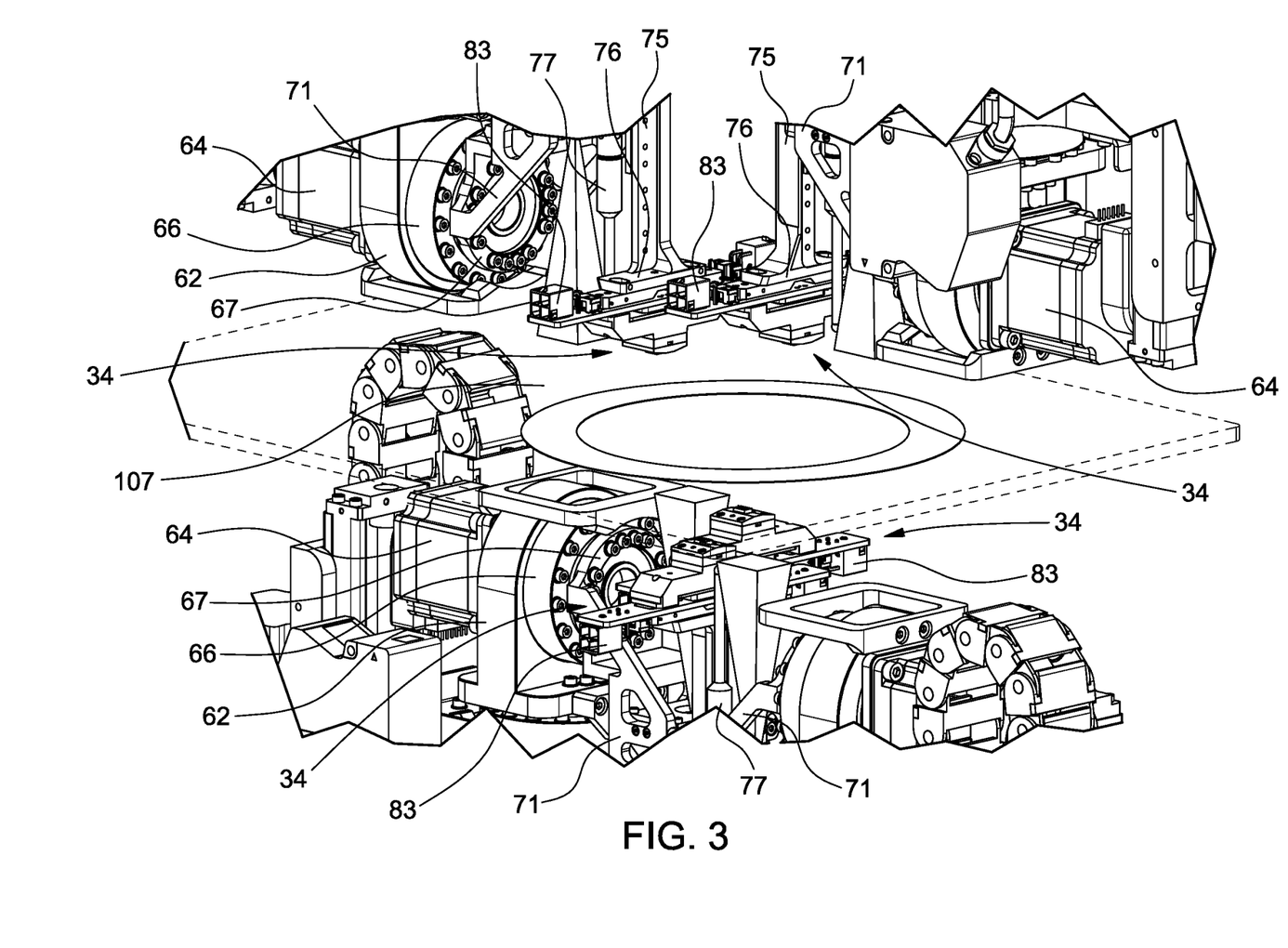
FIG. 3 is a perspective view of a detail of the wafer prober in FIG. 1.
Figure 4:
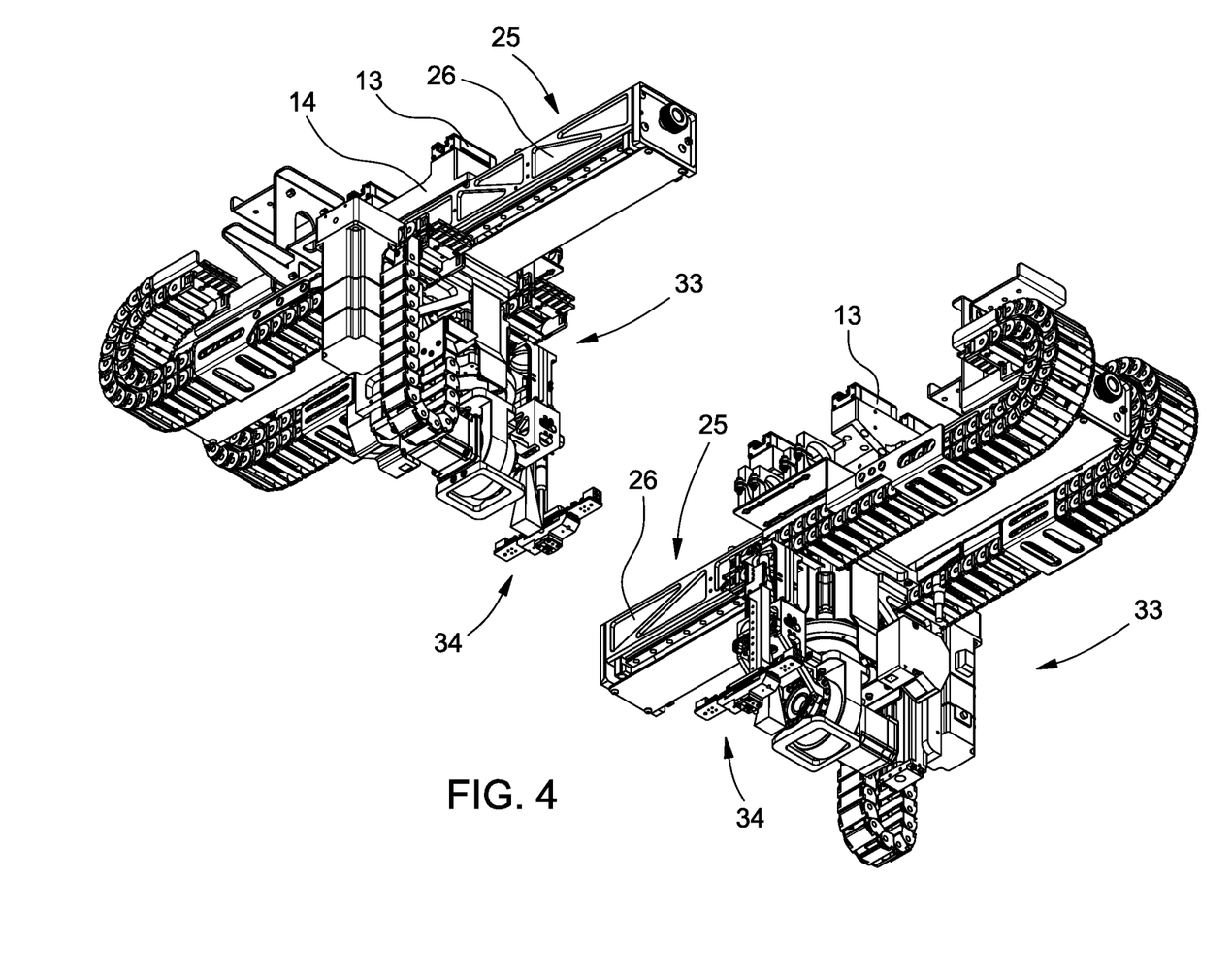
FIG. 4 is a perspective view of the wafer prober of FIG. 1, with parts removed for the sake of clarity.

In use, the wafer to be tested (FIG. 3) is arranged on a tray 107 movable on a horizontal plane between a wafer loading/unloading position outside the wafer prober 1 and a test position inside the compartment 8 of the wafer prober 1.

The control unit 106 controls, independently of each other, the measuring units 7, whose measuring heads 34 contact the wafer and perform measurements.

From an examination of the characteristics of the wafer prober 1, the advantages of the present invention are clear.

In particular, the plurality of the measuring heads 34 and their presence on both sides of the wafer makes it possible to simultaneously perform multiple measurements, reducing the overall test time.

Since the control unit 106 controls the measuring units 7 independently, the measuring heads 34 may be combined in an appropriate way depending on the arrangement of the components on the wafer, using probe cards 85 equal to or different from each other.

The presence of at least one rotational degree of freedom of the measuring heads 34 makes it possible to test wafers with complex configurations of semiconductor components. In particular, the wafer prober 1 is provided with at least one rotational degree of freedom, corresponding to the rotation of angle θ about the Z axis. This makes it possible both to read wafers comprising semiconductor components arranged with variable orientations and to manage any angular positioning errors of the wafer on the tray 107, detected e.g. via the cameras 73. In this case, the loading errors may be corrected by appropriately orienting the measuring heads 34.

Optionally, the wafer prober 1 may be provided with a second rotational degree of freedom, corresponding to the rotation of angle φ about a horizontal axis. In this case, the wafer prober 1 may correct non-planarity errors or allow the reading of wafers with non-planar parts.

The wafer prober 1 is an extremely versatile machine, since it also offers the possibility of changing the probe card 85 and/or the end element 93 thereof.

Finally, it is clear that modifications and variations may be made to the wafer prober 1 without departing from the scope of protection defined by the claims.

For example, the number of measuring units 7 could be different from four, and the number of rotational degrees of freedom could be different from two. The mechanical solutions adopted for the realisation of the various degrees of freedom could also vary.

The invention claimed is:

1. A wafer prober comprising a support structure (2) defining a first upper guide (11) and a first lower guide (11) parallel to a first horizontal axis and vertically overlapping with each other, a plurality of measuring units (7) each comprising a first carriage (14, 15, 21, 22) sliding along one respective first guide (11), a second guide (26) carried by the first carriage (14, 15, 21, 22) and parallel to a second horizontal axis orthogonal to the first axis, a second carriage (27) sliding along the second guide (26), a movable terminal assembly (33) carried by the second carriage (27), and a measuring head (34) carried by the movable terminal assembly (33) and provided with a plurality of needle contacts (105) configured to interact with respective points of the wafer, said movable terminal assembly (33) being configured to move the measuring head (34) according to a linear degree of freedom along a vertical axis and at least one rotational degree of freedom about said vertical axis, the wafer prober (1) comprising a control unit (106) which controls the measuring units (7) independently, wherein the measuring head (34) comprises a support (82) fixed to an output member (74) of the movable terminal assembly (33) and a probe card (85) interchangeable and connectable to the support (82) by means of a quick coupling (87), wherein the quick coupling (87) comprises a magnetic connection (88) and a centring coupling (89) between the support (82) and the probe card (85).

2. The wafer prober as claimed in claim 1, wherein the first carriage (14, 15, 21, 22) is movable along the first guide (11) by means of a linear-type first motor (12).

3. The wafer prober as claimed in claim 1, wherein the second carriage (27) is movable along the second guide (26) by means of a linear-type second motor (31).

4. The wafer prober as claimed in claim 1, wherein the movable terminal assembly (33) comprises a first element (41) carried by the first carriage (14, 15, 21, 22), a second element (46) movable with respect to the first element (41) along said vertical axis by means of a third motor (44), the output member (74) being movable with respect to the second element (46) by means of at least a rotary-type fourth motor (55) associated with said at least one rotational degree of freedom.

5. The wafer prober as claimed in claim 4, wherein the third motor (44) is a rotary-type motor and drives the second element (46) via a screw-nut system (45).

6. The wafer prober as claimed in claim 4, comprising a tray (107) for sequentially housing the wafers to be tested, the tray (107) being movable on a horizontal plane between a wafer loading/unloading position and a test position.

7. The wafer prober as claimed in claim 1, wherein the measuring head (34) comprises at least a first printed circuit board (81) coupled to the support (82) and at least a second printed circuit board (91) housed in the probe card (85), said boards (81, 91) being connectable to each other via spring contacts as a result of the engagement of the quick coupling (87).

8. The wafer prober as claimed in claim 7, wherein the first printed circuit board (81) is provided with at least one connector (83) for power and at least one connector (84) for signals connected to the control unit (106).

9. The wafer prober as claimed in claim 7, wherein the probe card (85) comprises a main body (86) to which the second printed circuit board (91) is coupled and an end element (93) provided with said needle contacts (105), the end element (93) being connected to the main body (86) via an intermediate plate (92) provided with a third printed circuit board (102) connected to the second printed circuit board (91) via elastic contacts (103) and to said needle contacts (105).

10. The wafer prober as claimed in claim 1, wherein the movable terminal assembly (33) defines at least a second rotational degree of freedom about a horizontal axis.

11. The wafer prober as claimed in claim 10, wherein the terminal movable assembly (33) comprises an intermediate element (56) movable with respect to the second element (46) by means of the rotary-type fourth motor (55), and a rotary-type fifth motor (64) interposed between the intermediate element (56) and the output member (74).

\* \* \* \* \*